United States Patent [19]

Gaudreau

[11] Patent Number: 4,562,032
[45] Date of Patent: Dec. 31, 1985

[54] METHOD FOR FORMING GRAIN COVERINGS ON REACTION INJECTION MOLDED ARTICLES

[75] Inventor: Laurent R. Gaudreau, So. Berwick, Me.

[73] Assignee: Ex-Cell-O Corporation, Troy, Mich.

[21] Appl. No.: 607,063

[22] Filed: May 4, 1984

[51] Int. Cl.[4] .................... B29C 45/00; B29C 45/16; B32B 3/30; B32B 5/20

[52] U.S. Cl. .................... 264/267; 249/91; 264/46.6; 264/328.6; 264/338; 264/DIG. 83; 425/129 R; 425/817 R; 425/DIG. 44

[58] Field of Search ............ 264/DIG. 83, 46.4, 46.6, 264/46.8, 338, 337, 267; 425/128, 129 R, DIG. 44; 249/83, 88, 91

[56] References Cited

U.S. PATENT DOCUMENTS

| | | | |
|---|---|---|---|
| 3,123,403 | 3/1964 | Hood | 264/46.6 X |
| 3,468,991 | 9/1969 | Krug | 264/338 X |
| 3,487,134 | 12/1969 | Burr | 264/46.6 |
| 3,525,783 | 8/1970 | Prikkel, III | 264/338 X |
| 3,539,144 | 11/1970 | Krug | 264/338 X |
| 3,576,930 | 4/1971 | Watters et al. | 264/46.4 X |
| 3,712,771 | 1/1973 | White et al. | 264/46.8 X |
| 3,856,908 | 12/1974 | Harper | 264/338 X |
| 3,970,732 | 7/1976 | Slaats et al. | 264/53 X |
| 4,028,450 | 6/1977 | Gould | 264/46.4 X |
| 4,116,736 | 9/1978 | Sanson et al. | 264/46.6 X |
| 4,271,108 | 6/1981 | Reffelmann | 264/338 X |
| 4,426,348 | 1/1984 | Salisbury | 264/328.6 |

FOREIGN PATENT DOCUMENTS

| | | | |
|---|---|---|---|
| 53-139686 | 12/1978 | Japan | 264/46.8 |
| 56-44633 | 4/1981 | Japan | 264/46.6 |

OTHER PUBLICATIONS

Becker, Walter E., Edt. *Reaction Injection Molding*, New York, Van Nostrand Reinhold, ©1979, pp. 78-80; 219-232.

*Primary Examiner*—Philip Anderson
*Attorney, Agent, or Firm*—John C. Evans

[57] ABSTRACT

A method and apparatus for producing a molded article comprising covering at least a portion of the mold wall with a thin smooth surfaced soft lining as an integral permanent lower part of the mold cavity, thereafter loading a preformed grained vinyl shell against at least a portion of the soft lining; closing the mold and injecting a reactive plastic formulation into the mold such that the reactive plastic material forms a rigid backing layer that is strongly bonded to the vinyl shell without distorting the vinyl.

3 Claims, 10 Drawing Figures

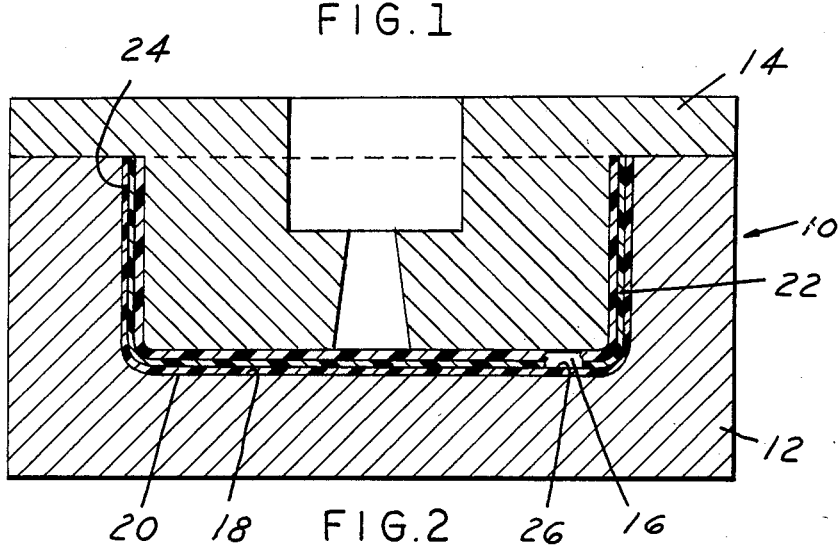
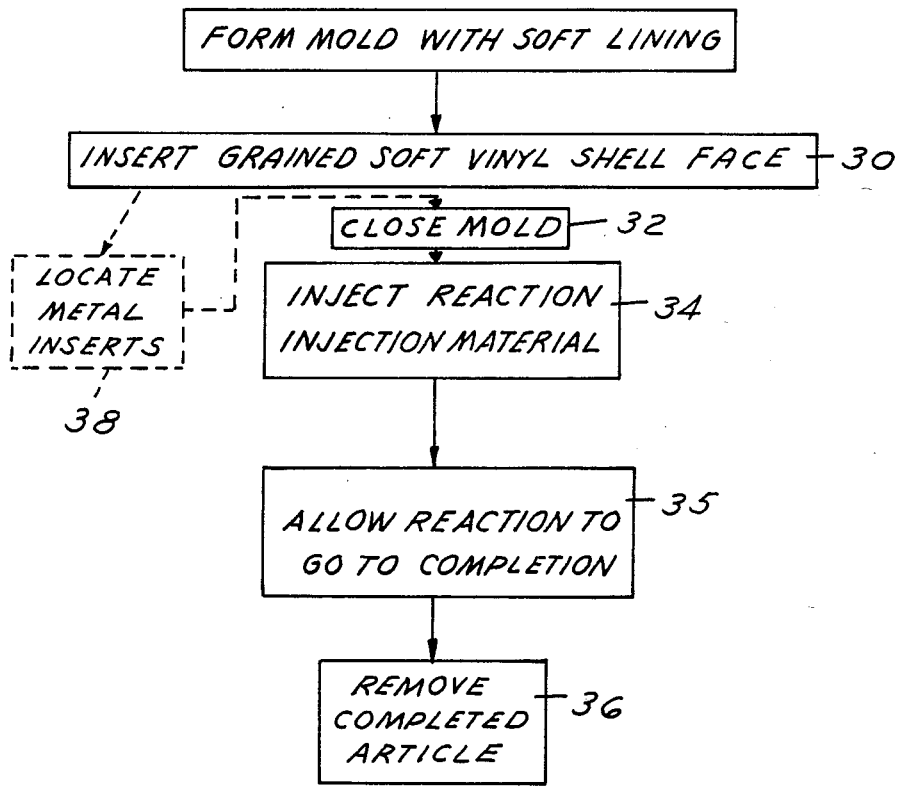

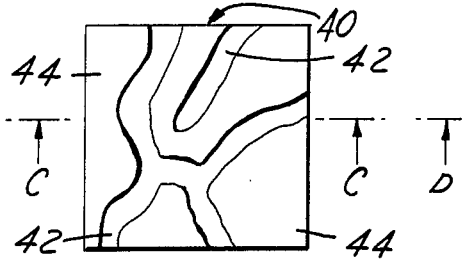
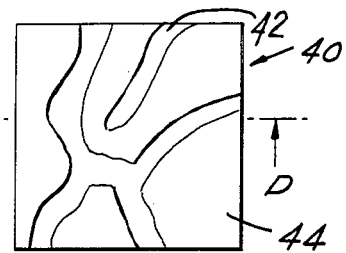
FIG. 3A PRIOR ART — BEFORE MOLDING
FIG. 3B PRIOR ART — AFTER MOLDING
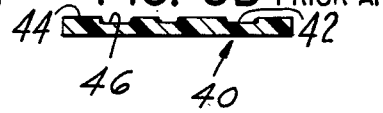
FIG. 3C PRIOR ART
FIG. 3D PRIOR ART
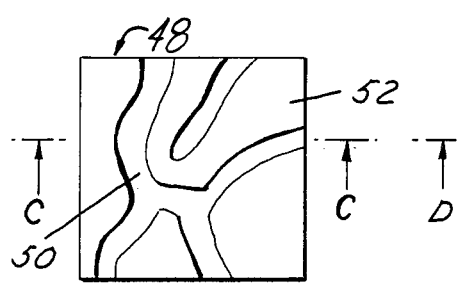
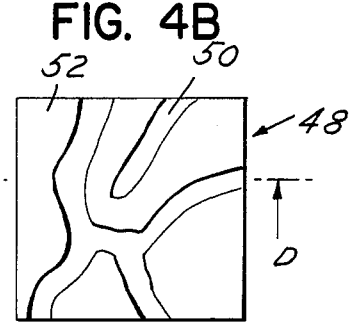
FIG. 4A — BEFORE MOLDING
FIG. 4B — AFTER MOLDING
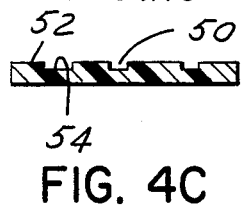
FIG. 4C
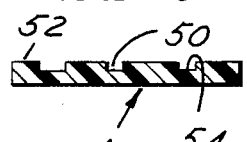
FIG. 4D

METHOD FOR FORMING GRAIN COVERINGS ON REACTION INJECTION MOLDED ARTICLES

TECHNICAL FIELD

This invention pertains to a method and apparatus for forming integrally bonded skins or coverings on articles formed from reaction injection molded plastics such as urethanes, DCPD, (dicyclodipentadiene), and polyesters. It has particular utility in the manufacture of decorative automobile trim components such as door panels, glove box doors, fuse box covers, pillar post covers and the like.

BACKGROUND ART

The automotive industry has turned to the use of padded-safety trim components comprising a polyvinyl chloride spaced from a metal or rigid plastic insert wherein the space between is filled with a urethane foam that is foamed in place to give a well-bonded integral structure. See, for example, the trim components disclosed in U.S. Pat. No. 3,123,403. The acceptance of such components has been because inter alia this type of padded construction permits a wide latitude in styling and color, and grain effects which are most desired particularly in the interior design of automobiles. To provide well matched color and grain, it is desirable to use the same polyvinyl chloride skin materials in surrounding and adjacent parts where padding is not needed.

The current state of the art includes loading a pre-formed grained vinyl shell in an ungrained mold of aluminum or epoxy construction and pouring reaction injection molding material or reinforced injection molding material of urethane or other compositions directly behind the shell to form an integral rigid substrate which is strongly bonded to the grained vinyl shell and which supports the shell thereby providing an unpadded article that matches the adjacent padded articles but at lower cost. The process can result in flattening of the grained face of the vinyl shell due to pressure and exotherm heat developed during the reaction injection molding action.

Other processes use a mold made from silicone or urethane materials with a hardness in the range of 60-90 shore A. These molds are cast with pre-formed grained relief to create a grain in the outer surface of micro-cellular urethane moldings. This type of mold is employed without a vinyl shell or skin.

STATEMENT OF INVENTION AND ADVANTAGES

In accordance with the present invention, a pour mold is formed with a thin, soft lining having a softness in the range of 25-80 durometer shore 00; a density in the range of 6 to 35 PCF and a thickness in the range of 0.010 to 0.100 inches. The soft lining is formed as an integral part of the pour mold cavity surface and covers at least a portion of the cavity surface.

A pre-formed, vinyl shell with a grained outer surface is loaded on the soft lining with the grain relief engaging the soft lining. An advantage of the present invention is that the soft lining thickness is of uniform cross-section and is kept to a minimum thickness in order to allow only the grain depth to protrude into the lining to prevent grain flattening during the molding process while providing a sufficiently defined mold support to prevent distortion of the overall shape and style lines of the part to be molded.

Other advantages of the present invention will be readily appreciated as the same becomes better understood by reference to the following detailed description when considered in connection with the accompanying drawings wherein:

FIG. 1 is a cross-sectional view of a pour mold including the present invention;

FIG. 2 is a schematic illustration of carrying out the method of the present invention;

FIGS. 3A and 3B show before and after surface grain relief patterns using prior art mold apparatus and methods; FIG. 3C is a cross-section taken on line 3C—3C of FIG. 3A looking in the direction of the arrows; and FIG. 3D is a cross-section taken on the line 3D—3D of FIG. 3B;

FIGS. 4A and 4B show before and after surface grain relief patterns using the mold apparatus and methods of the present invention; FIG. 4C is a cross-section taken on line 4C—4C of FIG. 4A looking in the direction of the arrows; and FIG. 4D is a cross-section taken along the line 4D—4D of FIG. 4B looking in the direction of the arrows.

DETAILED DESCRIPTION OF THE INVENTION

A mold assembly constructed in accordance with the present invention is generally shown at 10 in FIG. 1. The assembly 10 includes at least one pour mold part 12 which in conjunction with mold cover 14 defines a mold cavity 16.

At least a portion of the surface 18 of pour mold part 12 is covered by a soft lining 20 formed as an integral permanent part of the pour mold part 12 so that its exposed surface defines the mold cavity 16. At the start of the inventive method the mold cover 14 is opened and a vinyl shell 22 with a pre-formed grain surface 24 is loaded into the mold cavity 16 so that the grain surface 24 is supported by a smooth surface 26 of the soft lining 20. The vinyl shell 22 is substantially complete as removed from its mold and includes a desired part shape and style lines for the design of the part to be formed by the mold process of the present invention. The pour mold part 12 and soft lining 20 are configured to support the vinyl shell 22 to maintain its pre-formed part shape and style lines. Further, the thickness of the soft lining 20 is minimized to assure such support and further is of a depth which will allow the grain ridges 28 (shown in FIG. 4) to protrude into the soft lining 20.

In brief compass, this invention is a process of manufacturing an article of reaction injection molded material which is intimately bonded to the vinyl shell 22. The process comprises coating a mold cavity part 14 with suitable release surface thereon; closing the mold with the vinyl shell 22 loaded in place on lining 20; injecting a reactive plastic formulation, for example, a reaction injection molding polyurethane composition therein, allowing the reaction to go to completion while at the same time bonding the vinyl shell 22 to the reaction injection molded material, and thereafter removing the completed article from the mold.

The outer shell 22 which is attached to the molded substrate can be pigmented and grained so the article is substantially complete as removed from the mold. Also, as is customary, metal or plastic inserts or attaching members can be placed in the mold prior to the molding step. The shell 22 that is placed within the mold usually will be a thermoplastic material, such as vinyl. Generally speaking, it will have a thickness in the order of 0.015 to 0.090 inches.

EXAMPLES

Suitable soft linings 20 for use in the apparatus and method of the present invention are listed in the following tabulation. Other similar materials could be employed.

|  | Thickness in " | Shore 00 Durometer | Density lbs./ft.$^3$ |
|---|---|---|---|
| 1. Cohrlastic No. R-10480 Silicone Sponge | 1/16 | 40–65 | 35 |
| 2. Rubatex No. R-411-N Neoprene Sponge | 1/16 | 25–45 | 10–16 |
| 3. Rubatex No. R-431-N Neoprene Sponge | 1/16 | 60–80 | 18–28 |
| 4. "Volara" Expanded Polyethylene Foam | 1/31 & 1/16 | 65 | 6 |

Cohrlastic is a trademark of CHR Industries, Inc. and the No. R-10480 material is available at its office at 407 East Street, New Haven, CN, 06509; Rubatex is a trademark of Rubatex Corp. and the R-411-N and R-431-N materials are available at its office at P.O. Box 340, Bedford, VA, 24523; Volara is a trademark of Voltek Inc. and the expanded polyethylene foam is available at its office at 100 Shepard Street, Lawrence, MA, 01843.

The vinyl shell 22 has a nominal shore A hardness of 75.

Suitable representative reaction injection molding polyurethane compositions and processes are set forth in U.S. Pat. No. 4,426,348 issued Jan. 17, 1984 for Polyurethane RIM system. Typically, the pressure exerted in the mold cavity is in the range of 50–75 psi.

FIG. 2 illustrates the above sequence of steps at the mold apparatus 10. The pre-formed grained vinyl shell 22 is loaded at 30 with its grained surface in engagement with soft lining 20. The mold is closed at 32 and the urethane reactive plastic formulation is injected at 34. Following a desired reaction period at 35, the finished article is removed at 36. The reference numeral 38 indicates an additional step that may occur in the practice of the invention.

In FIG. 3 a segment 40 of a pre-formed vinyl shell is illustrated with grain relief grooves 42 defined by ridges 44 and valleys 46. As previously discussed, such grain relief in prior art processes is loaded with the grain relief grooves in contact with a smooth metal or hard plastic mold surface. The resultant reaction injection molding pressure and heat tend to flatten the grain pattern to an almost smooth surface.

FIG. 4 shows a pre-formed vinyl shell segment 48 with grain relief grooves 50 defined by ridges 52 and valleys 54. The ridges 52 protrude into the thickness of the soft lining 20 during the reaction injection molding process.

The relative hardness of the lining 20 and the vinyl shell cooperate to form an equilibrium condition to hold the ridges 52 from the smooth hard surface 18 of the pour mold part 12 so that the grained surface retains its original grain relief shape so as to meet desired style features on the outer surface of the finished part.

The inventive apparatus and method of the present invention have been described in an illustrative manner, and it is to be understood that the terminology which has been used is intended to be in the nature of words of description rather than of limitation.

Obviously, many modifications and variations of the present invention are possible in light of the above teachings such as pouring, casting or injecting the lining into position in the pour mold cavity. It is therefore to be understood that the invention may be practiced otherwise than as specifically described herein and yet remain within the scope of the appended claims.

The embodiments of the invention in which an exclusive property or privilege is claimed are defined as follows:

1. A reaction injection molding process for forming a finished article having an undistorted grained surface on a vinyl shell component loaded into a mold cavity capable of repeated openings and closings comprising:
   (a) pre-forming a vinyl shell having a grained surface of a first hardness;
   (b) providing an integral soft lining on a mold part of the cavity having a hardness less than that of said vinyl shell and a thickness greater than the surface relief of the grained surface;
   (c) loading the pre-formed vinyl shell into the mold cavity with its grained surface in engagement with the soft lining;
   (d) closing the mold;
   (e) supplying the mold cavity with a reaction injection molding material mixture;
   (f) allowing the reaction of the ingredients injection into the mold cavity to go to completion;
   (g) holding the surface relief of the vinyl shell against the soft lining so as to prevent grain distortion by the substrate material of the pour mold cavity.

2. The process of claim 1 wherein:
   (a) the soft lining is a material having durometer in the range of 15 to 95 shore 00 hardness and a density in the range of 6 to 35 PCF.

3. The process of claim 1 wherein:
   (a) the soft lining is a material having a durometer in the range of 15 to 95 shore 00 hardness and a density in the range of 6 to 35 PCF; and
   (b) the vinyl shell has a durometer in the range of 50 to 95 shore A hardness.

* * * * *